United States Patent
Morgan et al.

(10) Patent No.: US 8,353,029 B2
(45) Date of Patent: *Jan. 8, 2013

(54) ON DEMAND PROTECTION AGAINST WEB RESOURCES ASSOCIATED WITH UNDESIRABLE ACTIVITIES

(75) Inventors: Bruce A. Morgan, Bellevue, WA (US); Cornelis K. Van Dok, Bellevue, WA (US); Daniel M Saimo, Redmond, WA (US); Govind Varshney, Bellevue, WA (US); Sebastien Zimmermann, Redmond, WA (US); Tariq Sharif, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1760 days.

This patent is subject to a terminal disclaimer.

(21) Appl. No.: 11/272,464

(22) Filed: Nov. 10, 2005

(65) Prior Publication Data
US 2007/0118898 A1    May 24, 2007

(51) Int. Cl.
*G06F 12/14* (2006.01)
(52) U.S. Cl. .......... 726/22; 726/23; 726/24; 726/25; 709/223; 709/224; 709/229
(58) Field of Classification Search .............. None
See application file for complete search history.

(56) References Cited

U.S. PATENT DOCUMENTS

| | | |
|---|---|---|
| 5,664,099 A | 9/1997 | Ozzie et al. |
| 6,006,328 A | 12/1999 | Drake |
| 6,571,256 B1 | 5/2003 | Dorian et al. |
| 6,725,380 B1 | 4/2004 | Forlenza et al. |
| 6,874,084 B1 | 3/2005 | Dobner et al. |
| 7,082,429 B2 | 7/2006 | Lin et al. |
| 7,152,244 B2 | 12/2006 | Toomey |
| 7,194,004 B1 | 3/2007 | Thomsen |
| 7,457,823 B2 * | 11/2008 | Shraim et al. .............. 707/104.1 |
| 7,831,915 B2 | 11/2010 | Averbuch |
| 7,913,302 B2 * | 3/2011 | Shraim et al. ................... 726/22 |
| 7,984,304 B1 | 7/2011 | Waldspurger et al. |
| 2001/0039616 A1 | 11/2001 | Kumagai et al. |
| 2002/0066039 A1 | 5/2002 | Dent |
| 2002/0124172 A1 | 9/2002 | Manahan |

(Continued)

FOREIGN PATENT DOCUMENTS

GB    2401445    11/2004

(Continued)

OTHER PUBLICATIONS

Verisign Inc., "Licensing verisign certificates: securing multiple web server and domain configurations", www.msctrustgate.com/pdf/licensing.pdf, white paper,(2001).

(Continued)

*Primary Examiner* — Pramila Parthasarathy
(74) *Attorney, Agent, or Firm* — Wolfe-SBMC (57) ABSTRACT

Various embodiments provide protection against web resources associated with one or more undesirable activities. In at least some embodiments, a method detects and responds to a user-initiated activity on a computing device. Responding can include, by way of example and not limitation, checking locally, on the computing device, whether a web resource that is associated with the user-initiated activity has been identified as being associated with a safe site. If the web resource is not associated with a safe site, the user will be notified and given the option to check remotely, away from the computing device, whether the web resource is identified as being at least possibly associated with one or more undesirable activities.

20 Claims, 9 Drawing Sheets

U.S. PATENT DOCUMENTS

| | | | |
|---|---|---|---|
| 2002/0184491 | A1 | 12/2002 | Morgan et al. |
| 2003/0028762 | A1 | 2/2003 | Trilli et al. |
| 2003/0097591 | A1 | 5/2003 | Pham et al. |
| 2004/0003248 | A1 | 1/2004 | Arkhipov |
| 2004/0123157 | A1 | 6/2004 | Alagna et al. |
| 2004/0128552 | A1 | 7/2004 | Toomey |
| 2004/0236874 | A1 | 11/2004 | Largman et al. |
| 2005/0027822 | A1 | 2/2005 | Plaza |
| 2005/0086161 | A1 | 4/2005 | Gallant |
| 2005/0268100 | A1 | 12/2005 | Gasparini et al. |
| 2006/0015722 | A1 | 1/2006 | Rowan et al. |
| 2006/0053293 | A1 | 3/2006 | Zager et al. |
| 2006/0075504 | A1 | 4/2006 | Liu |
| 2006/0080444 | A1 | 4/2006 | Peddemors et al. |
| 2006/0095404 | A1 | 5/2006 | Adelman et al. |
| 2006/0095955 | A1 | 5/2006 | Vong |
| 2006/0218403 | A1 | 9/2006 | Sauve et al. |
| 2006/0224511 | A1* | 10/2006 | Allemann ............... 705/43 |
| 2007/0006305 | A1 | 1/2007 | Florencio et al. |
| 2007/0055749 | A1 | 3/2007 | Chien |
| 2007/0083670 | A1 | 4/2007 | Kelley et al. |
| 2007/0107054 | A1 | 5/2007 | Averbuch |
| 2011/0047617 | A1 | 2/2011 | Averbuch |

FOREIGN PATENT DOCUMENTS

| | | |
|---|---|---|
| WO | WO-2005031518 | 4/2005 |
| WO | WO-2005048522 | 5/2005 |

OTHER PUBLICATIONS

Herzberg, Amir et al., "Protecting valve web users, or preventing spoofing and establishing credential sites", www.cs.bu.ac.il/~herzea/papers/ecommerce/trusted_credentials_area.pdf, Bar Ilan University,(Jul. 2004).

Ncipher Inc., "Protecting commercial secure web servers from key-finding treats", www.ncipher.com/uploads/resources/pcws.pdf, white paper,(1999).

"Final Office Action", U.S. Appl. No. 11/272,473, (Feb. 4, 2009), 12 pages.

"Non Final Office Action", U.S. Appl. No. 11/272,473, (Jul. 24, 2009), 19 pages.

"How to: Use the Internet Explorer Content Advisor to Control Access to Web Sites in Internet Explorer", Retrieved from: <http://support.microsoft.com/kb/310401> on Jan. 29, 2010, (Dec. 5, 2003),2 pages.

"Internet Explorer 6: Browse the Web with Internet Explorer 6 and Content Advisor", Retrieved from: <http://www.microsoft.com/windows/ie/1e6/using/howto/security/contentadv/config.mspx> on Jan. 29, 2010, (Mar. 26, 2003),4 pages.

"Non-Final Office Action", U.S. Appl. No. 11/272,473, (Feb. 4, 2010),10 pages.

Cowart, Robert et al., "Special Edition Using Microsoft Windows XP Home, Third Edition", Retrieved from: <http://proquest.safaribooksonline.com/0789732793> on Jan. 28, 2010 Que,(Dec. 1, 2004),27 pages.

Pogue, David "Windows XP Edition: The Missing Manual, 2nd Edition", Retrieved from: <http://proquest.safaribooksonline.com/059600897X> on Jan. 28, 2010, O'Reilly Media, Inc.,(Dec. 16, 2004),29 pages.

"Microsoft Phishing Filter", retrieved on Nov. 10, 2005 from <<http://msdn.microsoft.com/library/default.asp?url=/library/en-us/IETechCol/dnwebgen/msphishingfilterwp.asp>>, (Jul. 2005),8 pages.

"Non-Final Office Action", U.S. Appl. No. 11/272,473, (Jun. 12, 2008),13 pages.

"Proofpoint: Proofpoint Protects Corporate Email from Recent Fraudulent Spam "Phishing" Epidemic", Retrieved on Nov. 10, 2005 from <<http://www.proofpoint/com/news/pressdetail.php-?PressReleaseID=50>>, (Aug. 20, 2003),2 pages.

"SurfControl Expands Unified Phishing Attach Protection for Global Enterprises", retrieved on Nov. 10, 2005 at <<htttp://www.surfcontrol.com/viewhandler.aspx?id=332&newsid=716, (Mar. 10, 2005),2 pages.

"Technology Overview: Microsoft Internet Explorer 7 Beta 1 for Windows Vista and Windows XP sp2", retrieved on Nov. 10, 2005 from <<http://blog.ben-ward.co.uk.media/IE7%20Technical%20Overview.pdf, (Jul. 2005),pp. 1-16.

"Notice of Allowance", U.S. Appl. No. 11/272,473, (Jul. 26, 2010),8 pages.

"Non-Final Office Action", U.S. Appl. No. 12/939,735, (May 7, 2012),15 pages.

"Final Office Action", U.S. Appl. No. 12/939,735, (Oct. 23, 2012), 20 pages.

* cited by examiner

ON DEMAND PROTECTION AGAINST WEB RESOURCES ASSOCIATED WITH UNDESIRABLE ACTIVITIES

BACKGROUND

Many threats have emerged regarding online communications. Often, these threats involve web resources that can be associated with undesirable activities that can somehow impact a user and/or the user's computing device. Undesirable activities can come in many shapes and sizes. For example, phishing, where scammers or other bad actors attempt to gain illegal or unauthorized access to private information, is one example of such a threat.

Online communication can allow these scammers to reach many people easily through the use of such things as e-mail, instant messaging, or rogue web pages. Often, a user is misled into navigating to a fraudulent link that the user believes is trustworthy. As a consequence, the user may be subject to attempts to elicit private information from the user. For example, a user might type "bankoamerica.com" in an address box in an attempt to link to a Bank of America website. Once the user navigates to what appears to be, but is not, a legitimate Bank of America website, the user might inadvertently divulge private information upon request and thus be "phished".

Another way in which a user can be "phished" is by responding to an email that appears to the user to be legitimate. For example, the user may be involved in an online transaction (such as an eBay auction) and receive an email which requests that the user click a link and enter personal information in that regard.

Other examples of undesirable activities can include such things as unknowingly receiving spyware or malware.

SUMMARY

Various embodiments can protect a user against web resources associated with one or more undesirable activities. In at least some embodiments, a method detects and responds to a user-initiated activity on a computing device. Responding can include, by way of example and not limitation, checking locally, on the computing device, whether a web resource that is associated with the user-initiated activity has been identified as being associated with a safe site. After checking locally, some embodiments present the user with a notification that the web resource is not associated with a safe site. The user is then given an option to check remotely or to continue with the user-initiated activity without checking remotely. Furthermore, in at least some embodiments, if the web resource is not identified as being associated with a safe site, the method checks remotely, away from the computing device, whether the web resource is identified as being at least possibly associated with one or more undesirable activities

DETAILED DESCRIPTION

Overview

Figure 1:
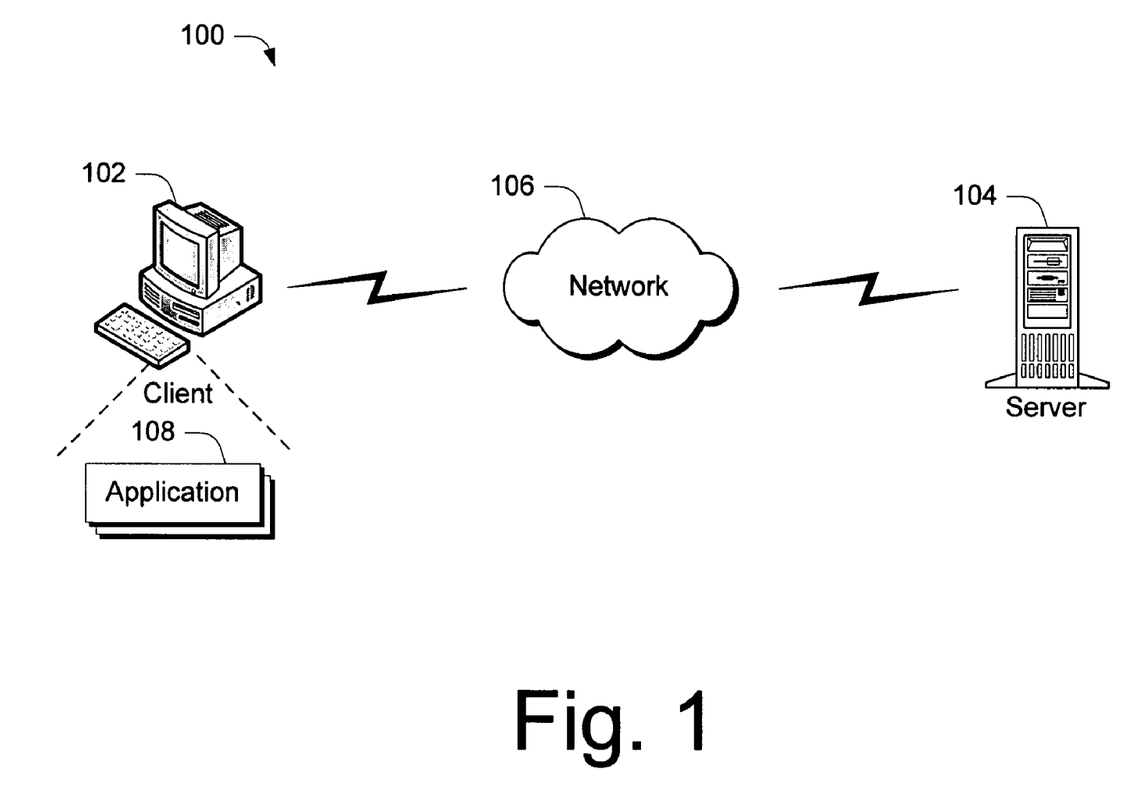
FIG. 1 illustrates a system in which the inventive principles can be employed in accordance with one embodiment.

Various embodiments can protect a user against web resources associated with one or more undesirable activities. In at least some embodiments, a method detects and responds to a user-initiated activity on a computing device. Responding can include, by way of example and not limitation, checking locally, on the computing device, whether a web resource that is associated with the user-initiated activity has been identified as being associated with a safe site. After checking locally, some embodiments present the user with a notification that the web resource is not associated with a safe site. The user is then given an option to check remotely or to continue with the user-initiated activity without checking remotely. Furthermore, in at least some embodiments, if the web resource is not identified as being associated with a safe site, the method checks remotely, away from the computing device, whether the web resource is identified as being at least possibly associated with one or more undesirable activities Exemplary Implementation FIG. 1 illustrates an exemplary system, generally at 100, in which various embodiments described below can be implemented in accordance with one embodiment. These various embodiments can protect against web resources that are determined or suspected of being associated with one or more undesirable activities.

There, system 100 includes a client 102 in the form of a computing device, a server 104 that is remote from the computing device, and a network 106 through which client 102 and server 104 can communicate. Client 102 can comprise any suitable computing device, such as a general purpose computer, handheld computer, and the like. In one embodiment, network 106 comprises the Internet.

In this example, client 102 embodies one or more software applications 108 through which client 102 and server 104 can communicate. Software application(s) 108 typically reside in the form of computer-readable instructions that reside on some type of computer-readable medium. Although any suitable application can be used, in the embodiments described in this document, an application in the form of a web browser is used. It is to be appreciated and understood, however, that other types of applications can be used without departing from the spirit and scope of the claimed subject matter. For example, applications such as word processing applications, email applications, spreadsheet applications, and the like can utilize the various inventive features described in this document.

Figure 2:
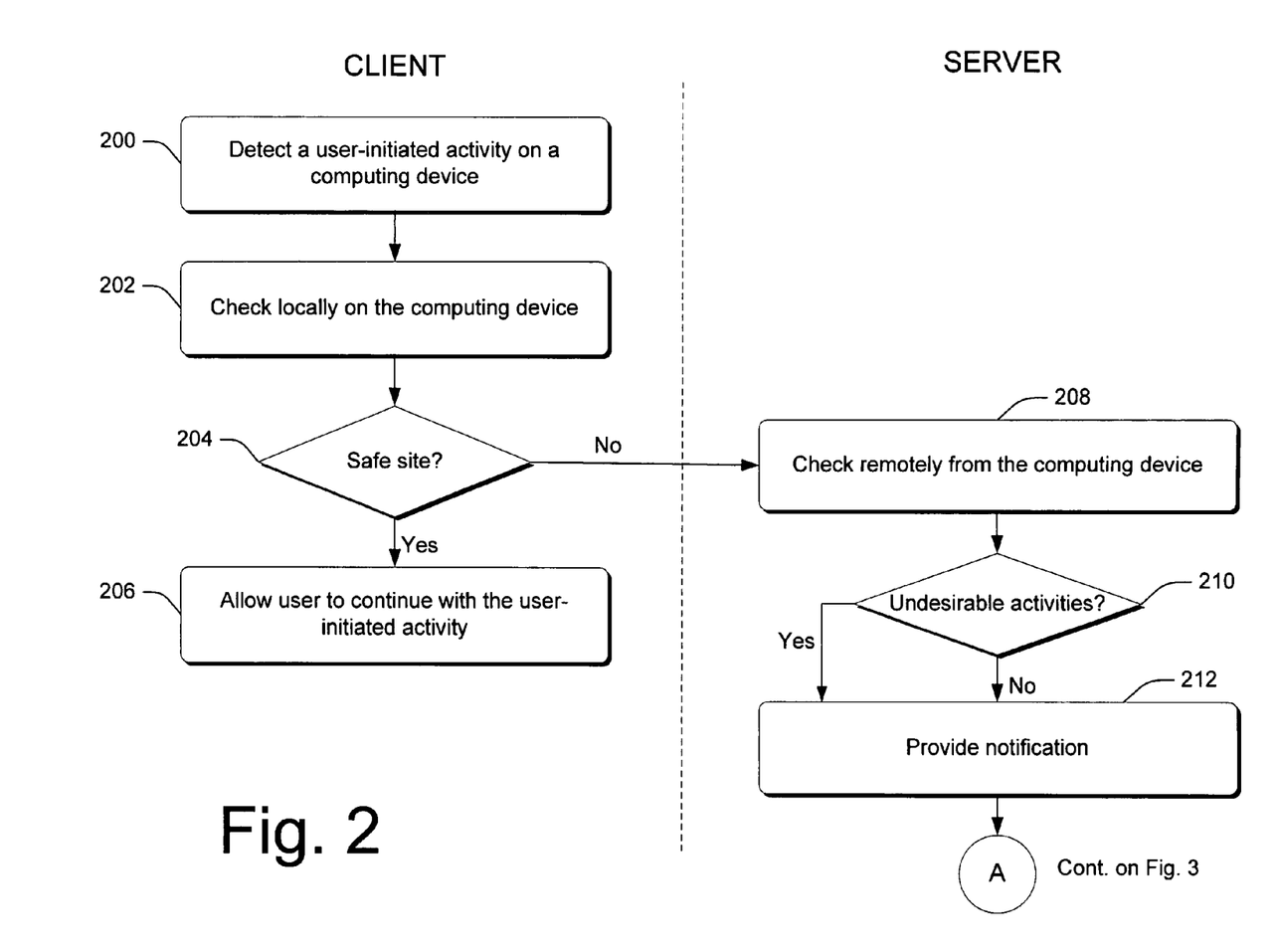
FIG. 2 is a flow diagram that describes steps in a method in accordance with one embodiment.
Figure 3:
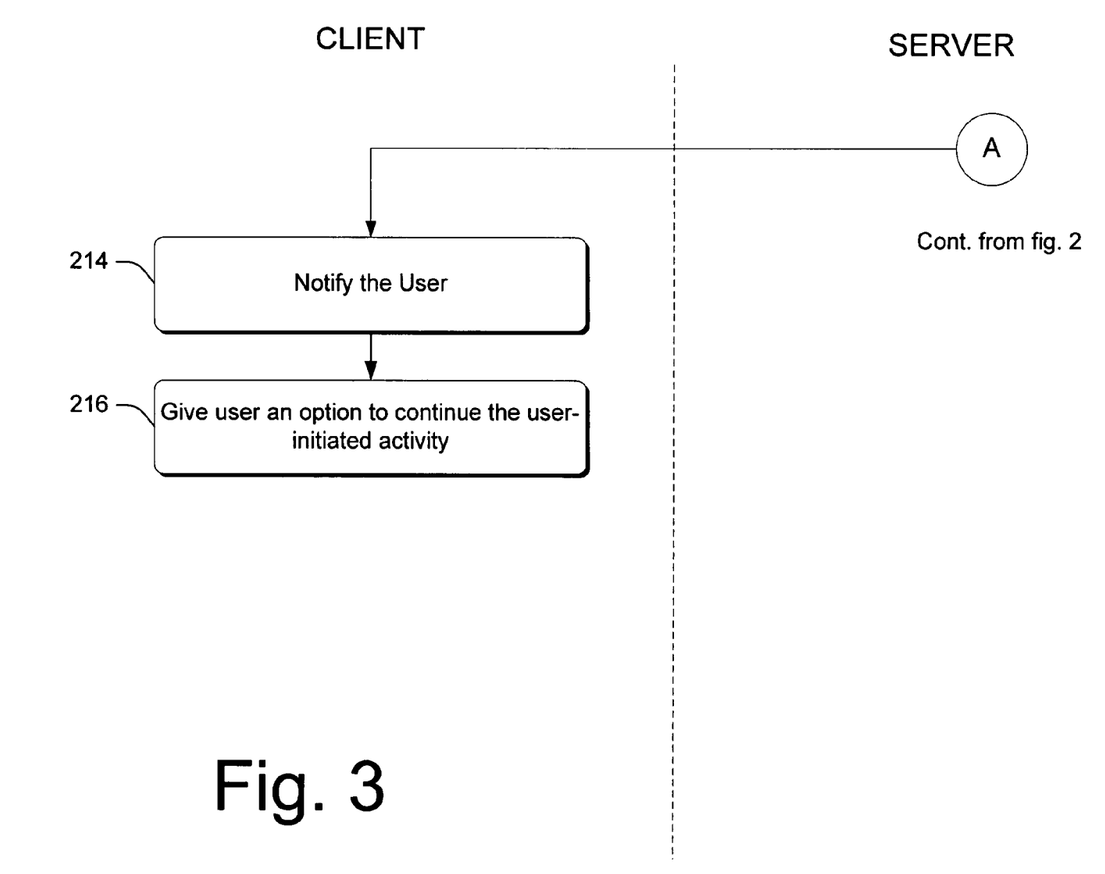
FIG. 3 continues from FIG. 2 and is a flow diagram that describes steps in a method in accordance with one embodiment.

FIGS. 2 and 3 are flow diagrams that describe a method in accordance with one embodiment. The method can be implemented in connection with any suitable hardware, software, firmware or combination thereof. In one embodiment, the method is implemented in software in the form of computer-executable instructions, such as those defining an application that executes on a client computing device.

Step 200 detects a user-initiated activity on a client computing device. Any suitable application can be used to detect the user-initiated activity. For example, in one embodiment, an application in the form of a web browser is used to detect a user-initiated activity in the form of a navigation associated with a web resource. In addition, any suitable manner of initiating the navigation can be utilized. For example, in some embodiments, navigation can be initiated by a user clicking on a particular link that the user finds on a web page. Alternately or additionally, the navigation can be initiated by a user typing a URL in an appropriate address box that comprises part of a web page that they are browsing.

Responsive to detecting the user-initiated activity, step 202 checks locally, on the client computing device, to ascertain whether a web resource that is associated with the user-initiated activity is identified as being associated with a safe site. This step of checking locally on the client computing device can occur contemporaneously with the user-initiated activity. For example, conducting such a check can occur contemporaneously with conducting a navigation associated with a third-party web site.

In some embodiments, the local device can maintain a list of sites that have been determined as safe. For example, the microsoft.com and amazon.com sites might appear on such a list and be considered safe sites. More generally, a safe site can be considered as one that is not associated with activities that are considered to be undesirable. One type of undesirable activity is phishing, although other undesirable activities can be the subject of the check without departing from the spirit and scope of the claimed subject matter. These other activities can include, by way of example and not limitation, activities associated with exposing the user to malware or spyware.

In conducting the local check, step 202 can be performed in any suitable way. By way of example and not limitation, a Uniform Resource Locator (URL) associated with a user-initiated navigation can be compared to a local list of URLs which are known to be safe.

If a match occurs (the "yes" branch from step 204), the URL associated with the navigation is identified as being associated with a safe site and step 206 allows the user to continue with the user-initiated activity.

If, on the other hand, the web resource is not identified as being associated with a safe site (i.e. the "no" branch from step 204), then step 208 checks remotely from the computing device to ascertain whether the web resource is identified as at least possibly being associated with one or more undesirable activities.

The step of checking remotely from the computing device can also occur contemporaneously with the user-initiated activity. For example, during the remote check, a user-initiated navigation to a third party site can be allowed to continue to provide a smoothly-perceived user experience.

The remote check can be performed in any suitable way. While FIGS. 2 and 3 illustrate this step as being performed remotely from the client computing device, this is not to be construed as meaning that one or more portions of this step, as described below, cannot be performed on the local client computing device.

As an example, consider the following. In at least some embodiments, one or more remote servers can be provided with information associated with a particular web resource, such as a link or web site. This information can come from a third party service that is designed to look for and keep track of sites that are or become affiliated with undesirable activities such as phishing and the like. In some instances, this information might be utilized to develop what is referred to as reputation information which can then be used as part of a score-based system to rank the web resource, as described below. More specifically, the reputation information can be provided to the local computing device which can then compute a local score associated with the web resource. The reputation information and the local score can then be processed to derive a reputation score that is associated with the web resource. Utilizing one or more of these scores, the web resource can be ranked in categories such as: a web resource known to be associated with one or more undesirable activities, a web resource suspected of being associated with one or more undesirable activities, or a web resource that is not known or suspected of being associated with one or more undesirable activities.

Step 210 determines whether the web resource is identified as at least possibly being associated with one or more undesirable activities. This can be accomplished in any suitable way. For example, here this can be accomplished by utilizing the web resource's derived reputation score, as noted above. Furthermore, this step can be performed completely remotely from the client computing device.

In the event that the web resource is identified as at least possibly being associated with one or more undesirable activities (i.e. the "yes" branch from step 210), step 212 provides a notification to this effect and step 214 (FIG. 3) notifies the user of this information. This can be performed in any suitable way. For example, the user might only be presented with an alert and/or a dialog box when the web resource has been identified as being suspected or actually being associated with undesirable activities. For example, in a score-based system, if the web resource is ranked in an appropriate category that suggests an undesirable association, then the user might be notified.

If the web resource is not identified as being associated with undesirable activities (i.e. the "no" branch from step 210), then a similar notification can be provided to the user at step 212.

Step 216 gives or provides the user with an option to continue the user-initiated activity. Typically this step is performed in the event that the web resource is identified as being associated with an undesirable activity, although it is illustrated slightly differently here.

Protecting Against Phishing Activities

As noted above, in at least some embodiments, the inventive principles are implemented in the context of policing against phishing activities. By detecting a user-initiated activity and checking to ascertain whether an associated web resource is associated with phishing, the user can be protected from attempts by scammers or other bad actors to gain illegal or unauthorized access to private information.

Figure 4:
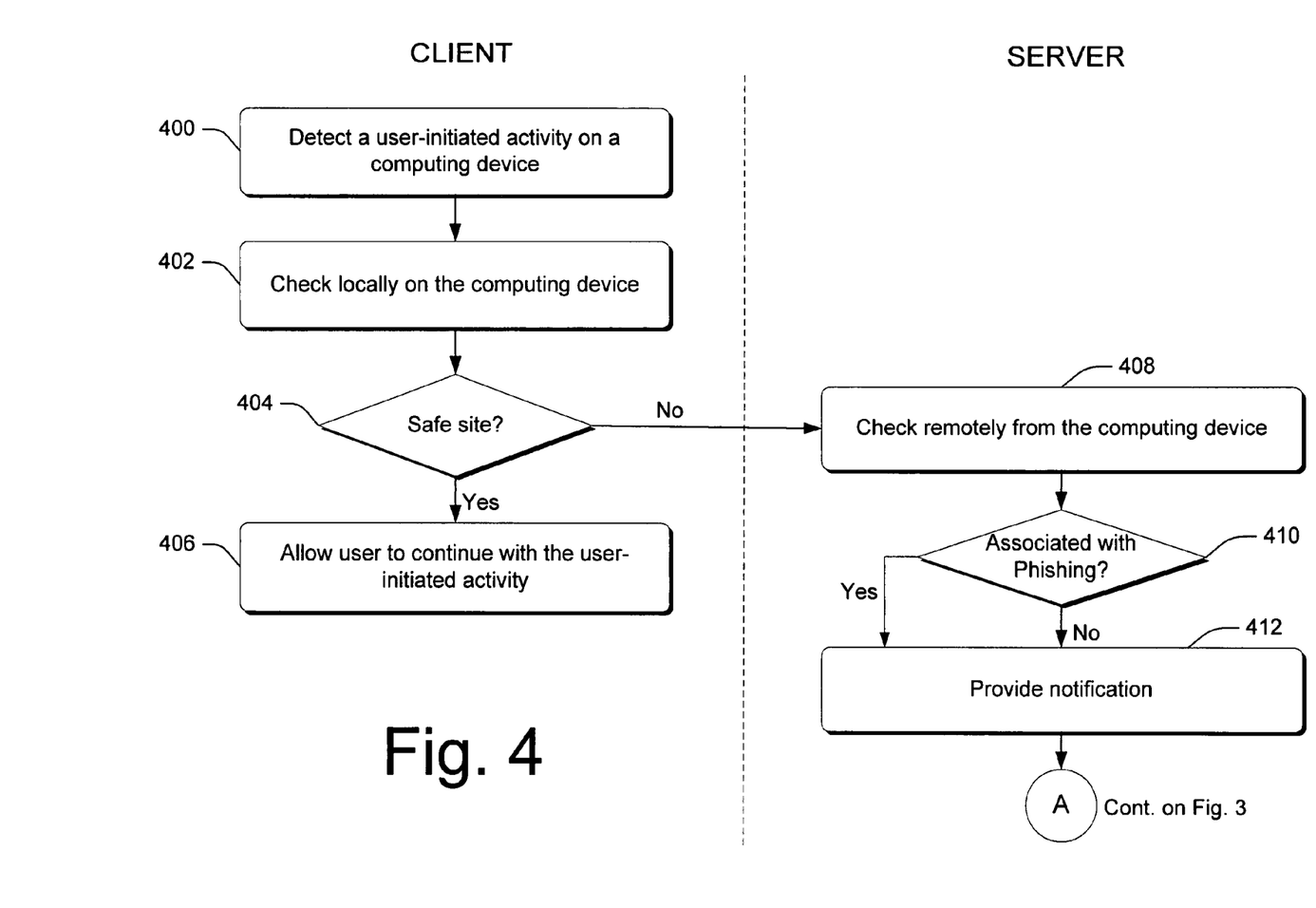
FIG. 4 is a flow diagram that describes steps in a method in accordance with one embodiment.
Figure 5:
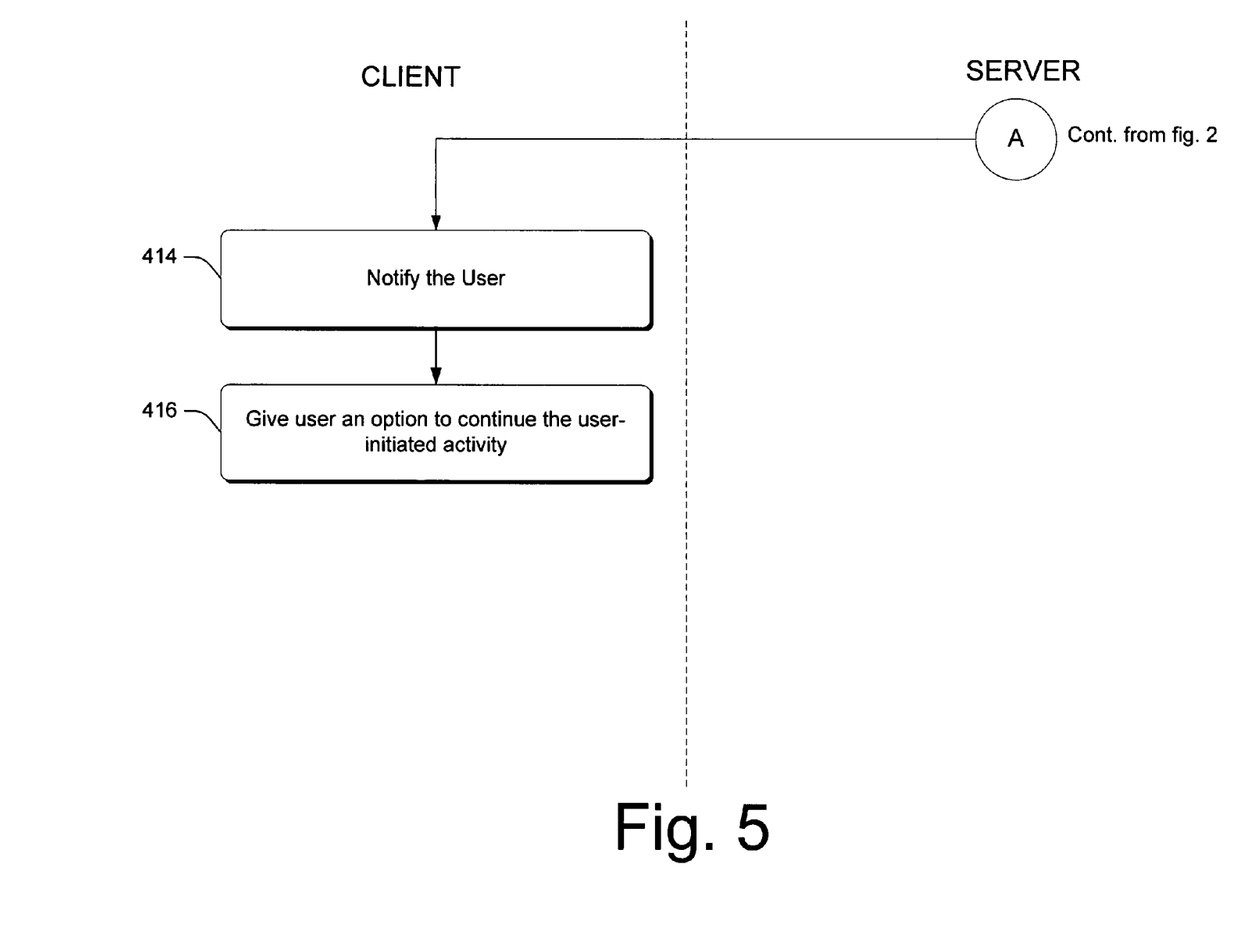
FIG. 5 continues from FIG. 4 and is a flow diagram that describes steps in a method in accordance with one embodiment.

As an example, consider FIGS. 4 and 5, which illustrate a method, in accordance with one embodiment, of protecting against phishing activities. The method can be implemented in connection with any suitable hardware, software, firmware or combination thereof. In one embodiment, the method is implemented in software in the form of computer-executable instructions, such as those defining an application that executes on a client computing device.

Step 400 detects a user-initiated activity on a client computing device. Any suitable application can be used to detect the user initiated activity. For example, in one embodiment, an application in the form of a web browser is used to detect a user-initiated activity in the form of an attempted navigation associated with a web resource.

Responsive to detecting the user-initiated activity, step 402 checks locally on the client computing device to determine whether a web resource that is associated with the user-initiated activity is identified as being associated with a safe site.

This step of checking, locally on the client computing device, can occur contemporaneously with the user-initiated activity. A safe site can be any site that is not associated with phishing activities. The local check that is performed can be performed in the same or similar manner as described above.

Step 404 determines whether the web resource that is associated with the user-initiated activity is identified as being associated with a safe site. If it is, then step 406 allows the user to continue with the user-initiated activity.

If, on the other hand, the web resource is not identified as being associated with a safe site, then step 408 checks remotely from the computing device, whether the web resource is identified as at least possibly being associated with a phishing activity. The remote check that is performed can be performed in the same or similar manner as described above.

Step 410 determines whether the web resource is identified as at least possibly being associated with a phishing activity. This can be accomplished by utilizing the web resource's derived reputation score, as noted above.

Step 412 provides a notification whether the web resource is identified as at least being associated with a phishing activity and step 414 (FIG. 5) notifies the user of this information. This can be performed in any suitable way. For example, the user might only be presented with an alert and/or dialog box when the web resource is ranked in one or more of the categories discussed above. Alternately, the user might always be presented with an alert and/or dialog box.

Step 416 gives or provides the user with an option to continue the user-initiated activity. Typically this step is performed in the event that the web resource is identified as being associated with a phishing activity, although it is illustrated slightly differently here.

One example of how steps 412-414 can be implemented, including the user interfaces that can be employed, is illustrated and discussed below in regards to FIGS. 9-10.

Providing a User with an Option to Check a Web Resource

As described above, in order to determine whether a web resource is associated with an undesirable activity, checking occurs remotely from the user's computing device. Doing so, however, can cause privacy concerns for some users. For example, if a user wants to navigate to a certain webpage, the URL of the web page can be sent to a remote server to verify the absence of any undesirable activities, such as phishing. Certain users may be uncomfortable with the notion of allowing a remote server to see certain web pages that the user frequents. Thus, some users may find it desirable to have the option of determining whether or not the remote check takes place.

Figure 6:
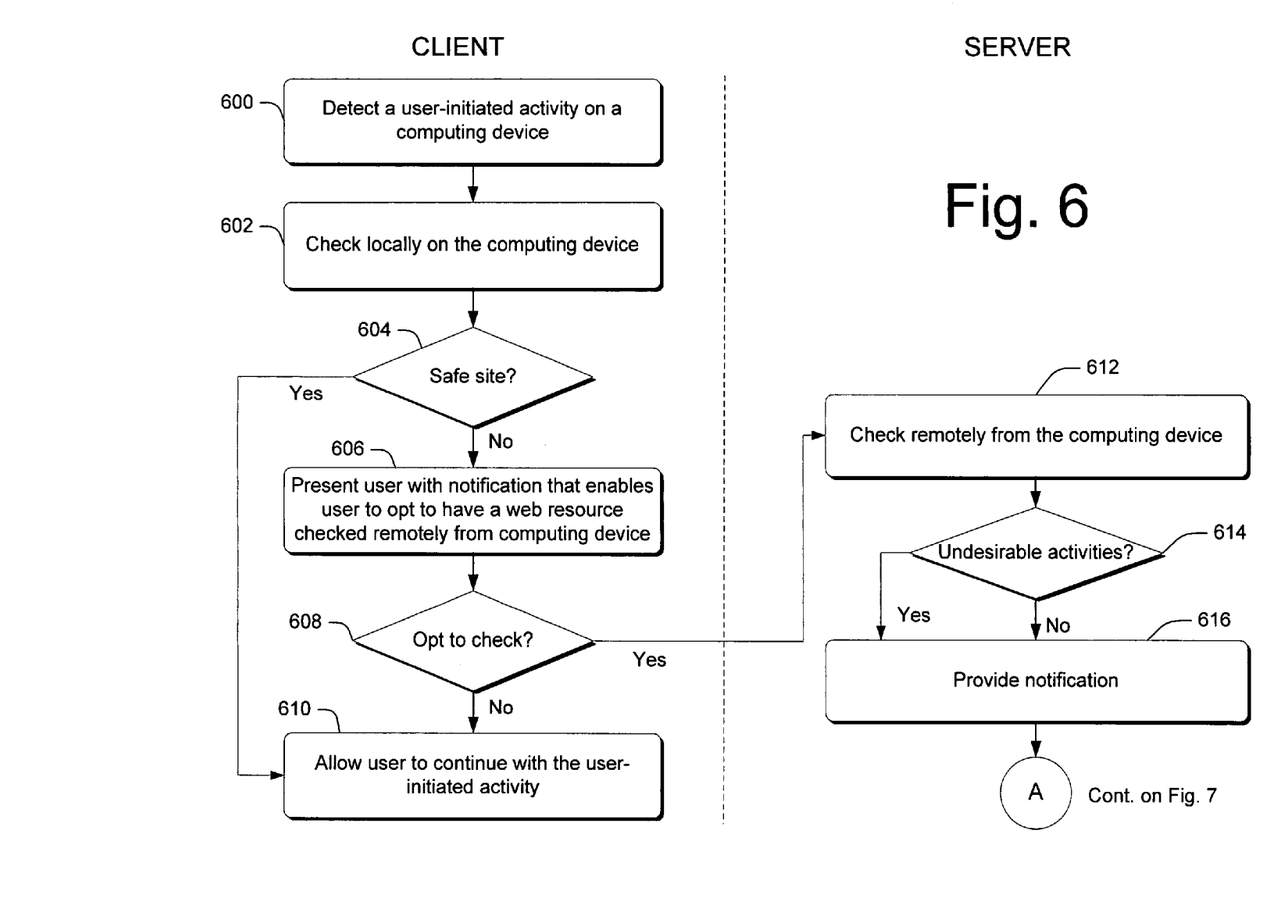
FIG. 6 is a flow diagram that describes steps in a method in accordance with one embodiment.
Figure 7:
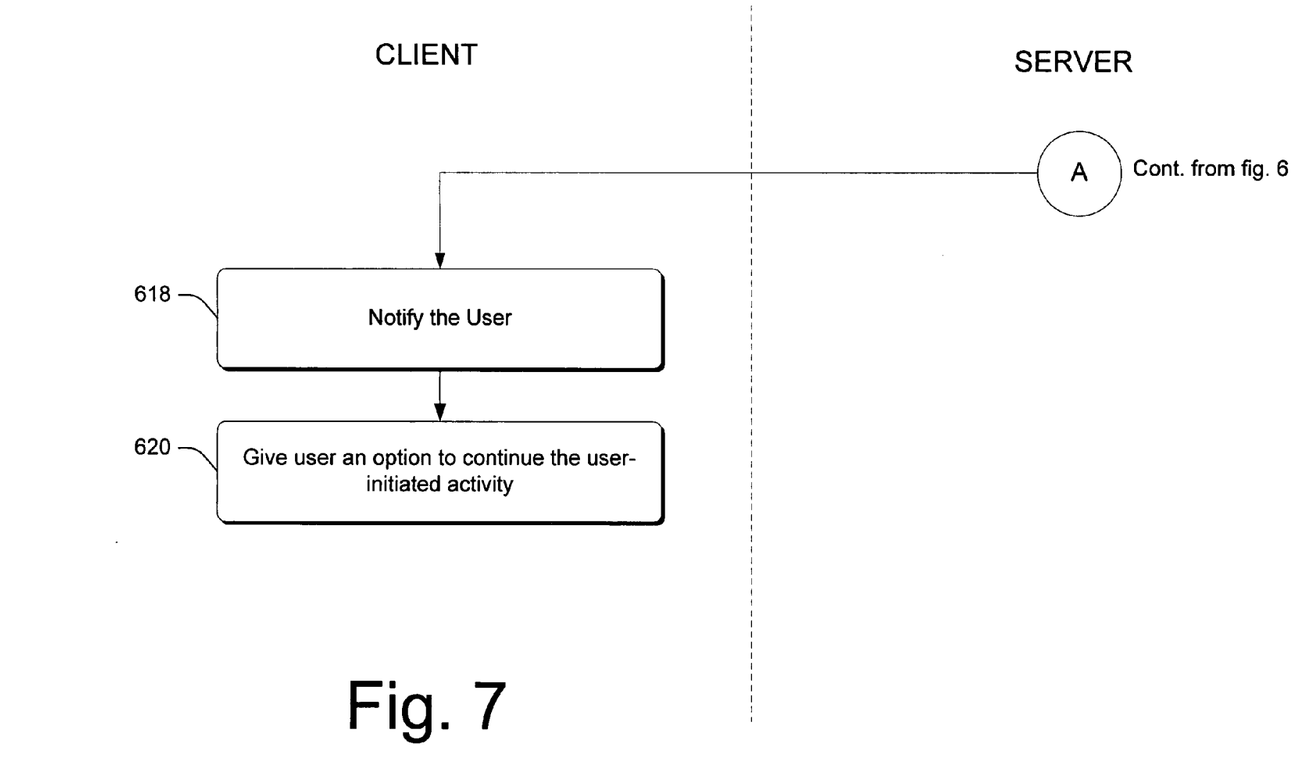
FIG. 7 continues from FIG. 6 and is a flow diagram that describes steps in a method in accordance with one embodiment.

FIGS. 6 and 7 are flow diagrams that describe a method in accordance with one embodiment with the aforementioned privacy concerns in mind. The method can be implemented in connection with any suitable hardware, software, firmware or combination thereof. In one embodiment, the method is implemented in software in the form of computer-executable instructions, such as those defining an application that executes on a client computing device.

Step 600 detects a user-initiated activity on a computing device. In but one embodiment, and as noted above, one such activity takes place when the user clicks on a link associated with a web resource. Such a link might be present as part of a web page, an email document, or some other document on which a user might be working. Other examples of user-initiated activities are given above.

After detecting a user-initiated activity, the web resource can be checked locally as discussed above and as illustrated by step 602. Step 604 then determines whether the web resource is identified as being associated with a safe site. If it is, then step 610 allows the user to continue with the user-initiated activity. Checking locally poses no security risks because all of the information is already contained on the user's computing device.

If however, the local check reveals that the web resource is not identified as being associated with a safe site (e.g., not contained in the local list of safe sites), the user can be notified as follows.

Step 606, presents a user with a notification that enables the user to opt to have a web resource checked to ascertain whether the web resource is associated with one or more undesirable activities. This notification effectively alerts the user that the web resource is not on the local list of safe sites and asks the user whether he or she would like to check remotely from the computing device to determine whether the web resource associated with, for example an attempted navigation, is associated with any undesirable activities. Examples of undesirable activities were given above.

If, at step 608, the user declines to check remotely, step 610 allows the user to continue with their activity. On the other hand, if the user opts to conduct the remote check, step 612 conducts the remote check by sending a request to an appropriate server or other remote device.

Step 614 determines whether the web resource is associated with any undesirable activities. This step can be performed in any suitable way, examples of which are provided above. Step 616 provides a notification to the user with regard to the remote check that was performed. Step 618 (FIG. 7) receives this notification from the remote server and presents the notification to the user.

The notification can either tell the user whether or not the web resource is associated with any undesirable activities, or provide information that can further be used to make that decision, as described above.

If the web resource is not associated with any undesirable activities, the user can continue with his or her activity. On the other hand, if the web resource is determined to be associated with undesirable activities, step 620 can provide the user with an option to continue with the activity despite the association with undesirable activities.

In Operation

The above methodology can be implemented in any suitable way using any suitable technology. As but one example of how the above-described techniques can be implemented from the perspective of the user, consider, FIGS. 8-10.

Figure 8:
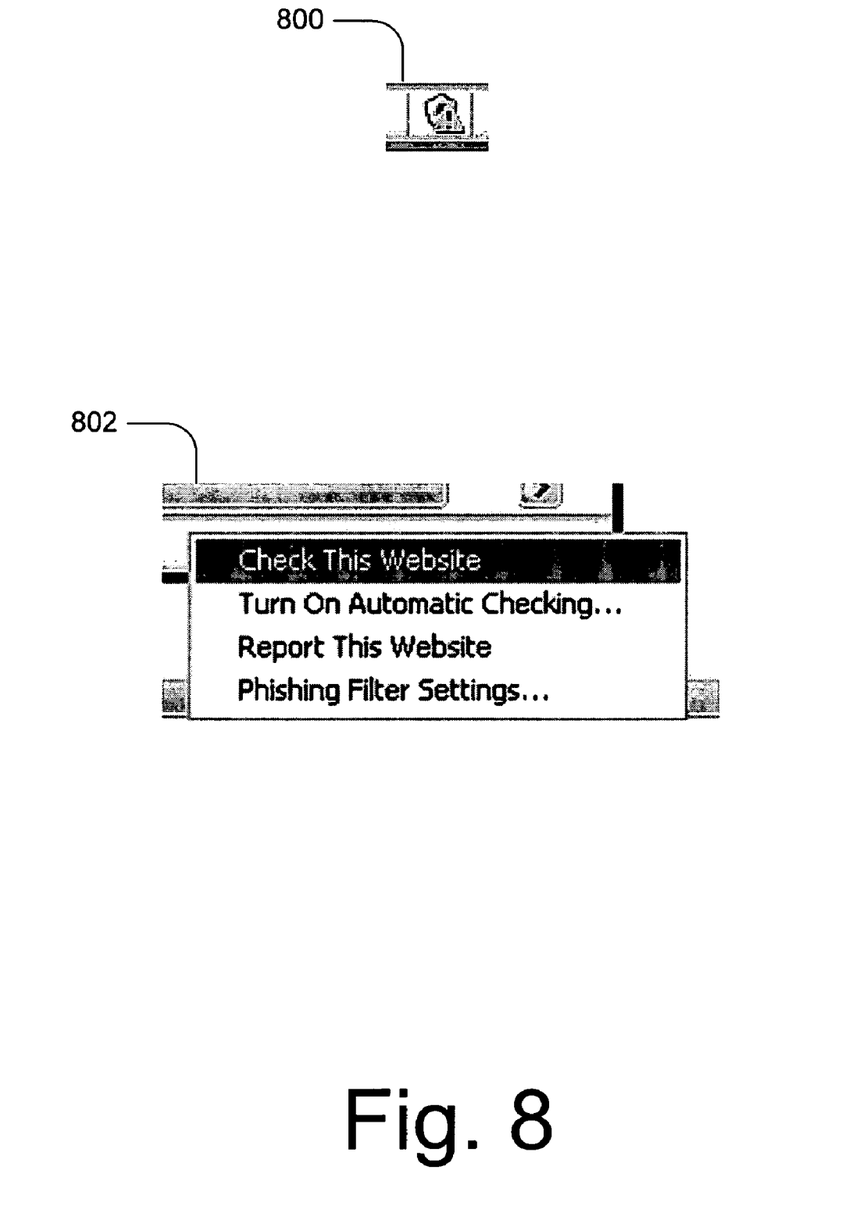
FIG. 8 illustrates a notification icon and list box presented to a user in accordance with one embodiment.

Specifically, if a particular user has chosen to be given the option of determining whether a remote check will occur, a notification icon, such as that shown at 800 in FIG. 8 can appear when a user-initiated activity is detected. This icon may appear in the toolbar of a web browser for the purpose of alerting the user that web resource to which he wishes to navigate is not on the local list of safe sites. When the user clicks on this icon, a list box can be presented to the user. One such list is shown at 802. The list gives the user the ability or option to check the website, turn on automatic checking, report the website, or change phishing filter settings.

If the user selects "check this website", the website will be checked remotely from the user's computing device as described above. If the user selects "turn on automatic checking" the website will be checked remotely from the user's computing device, and the next time that a user-initiated activity is detected and the web resource is not on the local list of safe sites, the remote check will automatically occur without notifying the user.

Figure 9:
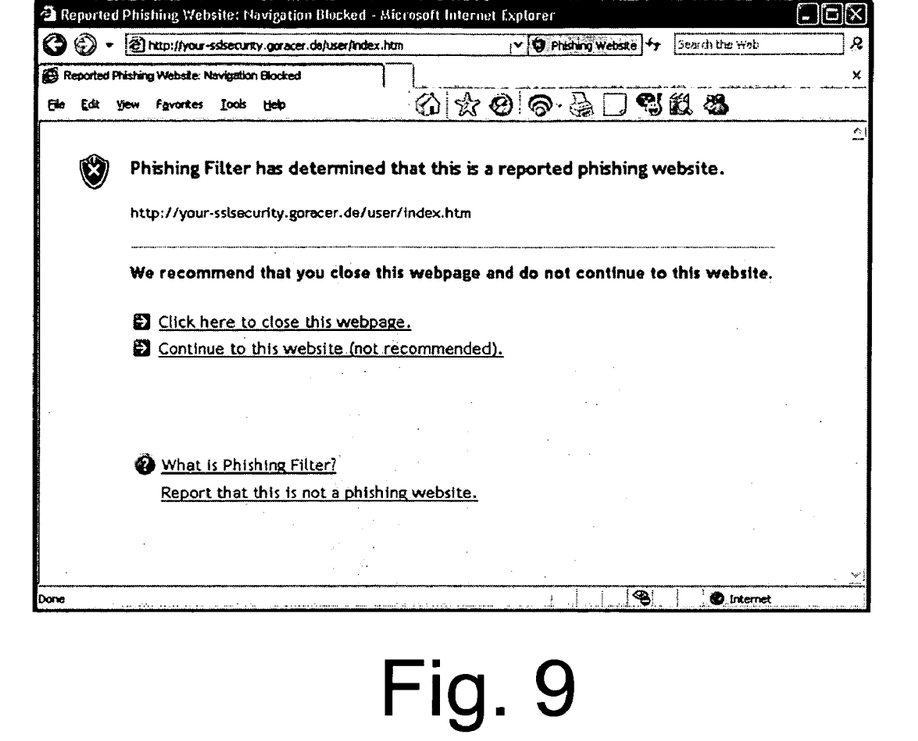
FIG. 9 illustrates a dialog box presented to a user in accordance with one

FIG. 9 illustrates a dialog box that is presented to a user when a website that the user has attempted to navigate to has been determined to be associated with a phishing activity. There, the user is notified that the website is a reported phishing website and is given the option of either continuing to the website or of closing the web page.

Figure 10:
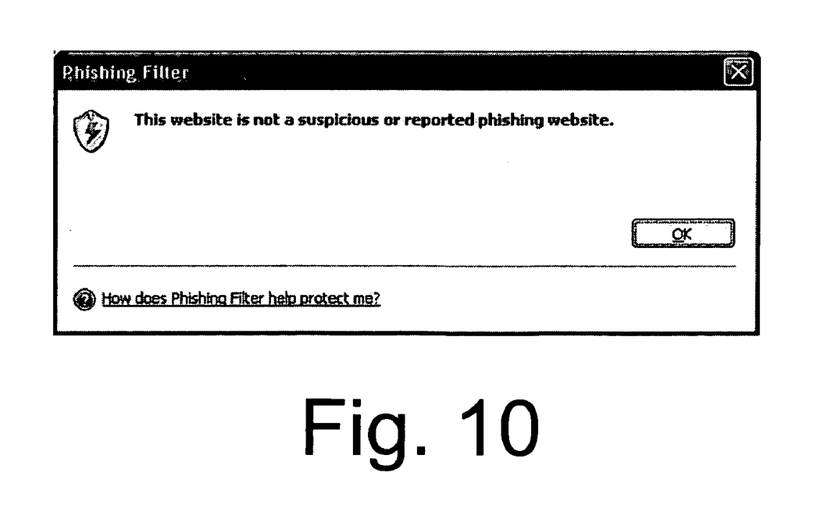
FIG. 10 illustrates a dialog box presented to a user in accordance with one embodiment.

FIG. 10 illustrates a dialog box that is presented to a user when a website that the user has attempted to navigate to is determined to not be associated with a phishing activity. There, the user is notified that the website is not a suspicious or reported website and the user can click "OK" to continue.

CONCLUSION

Various embodiments provide protection against web resources associated with one or more undesirable activities. In this manner, a user and/or the user's computing device can be protected from activities that could prove harmful.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
   responsive to a user-initiated activity on a computing device, presenting a first notification that enables a user to opt to have a web resource associated with the user-initiated activity checked to ascertain whether the web resource is associated with one or more undesirable activities, the user-initiated activity including an attempted navigation to the web resource and the one or more undesirable activities including at least one of phishing, malware, or spyware;
   responsive to a user opting to check the web resource, checking the web resource contemporaneously with conducting a navigation associated with said web resource; and
   causing a second notification to be presented that includes a result of the checking.

2. The computer-implemented method of claim 1 further comprising, prior to presenting the second notification and responsive to the user-initiated activity, checking locally on said computing device to determine whether the web resource associated with said user-initiated activity has been identified as being associated with a safe site.

3. The computer-implemented method of claim 1, wherein said checking the web resource occurs remote from said computing device to determine whether said web resource has been identified as at least possibly being associated with one or more undesirable activities.

4. The computer-implemented method of claim 3, wherein said web resource comprises a website.

5. The computer-implemented method of claim 1 further comprising providing an option that is configured to enable the user to configure the computing device to automatically check the web resource responsive to a user-initiated activity.

6. The computer-implemented method of claim 1, wherein said checking is based at least in part on a score-based system that ranks web resources based on whether a web resource known to be associated with one or more undesirable activities, a web resource is suspected of being associated with one or more undesirable activities, or a web resource is not known or suspected of being associated with one or more undesirable activities.

7. The computer-implemented method of claim 1, wherein said user-initiated activity comprises clicking a link.

8. The computer-implemented method of claim 1, wherein said user-initiated activity comprises typing a URL.

9. The computer-implemented method of claim 1, wherein the second notification indicates that said web resource is suspected or known to be associated with one or more undesirable activities or that said web resource is not suspected or known to be associated with one or more undesirable activities, the method further comprising presenting an option to continue said user-initiated activity in the event said web resource is suspected or known to be associated with one or more undesirable activities.

10. The computer-implemented method of claim 1, wherein said user-initiated activity occurs via a web browser.

11. A computer-implemented method comprising:
    responsive to an indication of a user's attempted navigation to a web resource via a web browser on a computing device, presenting a first notification that enables the user to opt to have the web resource associated with said attempted navigation checked to ascertain whether the web resource is associated with one or more undesirable activities, the one or more undesirable activities including at least one of phishing, malware, or spyware;
    responsive to an indication of the user opting to check the web resource, checking the web resource contemporaneously with conducting a navigation associated with said web resource; and
    presenting a second notification that includes a result of the checking.

12. The computer-implemented method of claim 11 further comprising, prior to presenting the user with the second notification and responsive to the indication of the user's attempted navigation, checking locally on said computing device to determine whether said web resource has been identified as being associated with a safe site.

13. The computer-implemented method of claim 11, wherein said checking the web resource occurs remote from said computing device to determine whether said web resource has been identified as at least possibly being associated with one or more undesirable activities.

14. The computer-implemented method of claim 13, wherein said web resource comprises a website.

15. The computer-implemented method of claim 11 further comprising providing an option to configure the computing device to automatically check the web resource responsive to the indication of the user's attempted navigation.

16. The computer-implemented method of claim 11, wherein said checking is based at least in part on a score-based system that ranks web resources based on whether a web resource known to be associated with one or more undesirable activities, a web resource is suspected of being associated with one or more undesirable activities, or a web resource is not known or suspected of being associated with one or more undesirable activities.

17. The computer-implemented method of claim 11, wherein the second notification indicates that said web resource is suspected or known to be associated with one or more undesirable activities or that said web resource is not suspected or known to be associated with one or more undesirable activities, the method further comprising providing an option to continue said navigation in the event said web resource is suspected or known to be associated with one or more undesirable activities.

18. A computer-implemented method comprising:
receiving a request, remote from a user's computing device, to determine whether a web resource is associated with a phishing activity, the request being received from the user's computing device in response to an attempted navigation associated with the web resource;
responsive to said receiving and contemporaneously with the user's computing device conducting the navigation, ascertaining whether the web resource associated with said navigation has been identified as at least possibly being associated with a phishing activity; and
communicating a notification for receipt by the user's computing device that the web resource associated with said navigation has been identified as at least possibly being associated with said phishing activity or that the web resource has not been identified as at least possibly being associated with said phishing activity, the notification being configured to enable the user's computing device to notify the user.

19. The computer-implemented method of claim 18, wherein said attempted navigation is initiated by a web browser.

20. The computer-implemented method of claim 18, wherein said attempted navigation is initiated by an application other than a web browser.

* * * * *